United States Patent [19]

Drumare

[11] 4,364,487
[45] Dec. 21, 1982

[54] SAFETY DEVICE AGAINST OVERPRESSURES

[76] Inventor: Huguette Drumare, 28, rue du Commandant Vesco, Sainte Adresse, France, 76310

[21] Appl. No.: 212,427

[22] Filed: Dec. 3, 1980

[51] Int. Cl.³ ............................................. B65D 25/00
[52] U.S. Cl. ................................. 220/89 A; 137/68 R
[58] Field of Search .................. 220/88 A, 89 A, 901; 137/68 R

[56] References Cited

U.S. PATENT DOCUMENTS

| | | | |
|---|---|---|---|
| 822,826 | 6/1906 | Coleman | 220/89 A |
| 2,256,673 | 9/1941 | Hansen | 220/89 A X |
| 2,393,078 | 1/1946 | Wager | 220/88 A X |
| 2,766,904 | 10/1956 | Philip | 220/89 A |
| 3,722,734 | 3/1973 | Raidl, Jr. | 137/68 R X |
| 3,881,629 | 5/1975 | Shaw et al. | 220/89 A |
| 3,919,855 | 11/1975 | Turner | 220/901 X |
| 3,934,602 | 1/1976 | Muddiman et al. | 220/89 A X |

FOREIGN PATENT DOCUMENTS

| | | | |
|---|---|---|---|
| 2113855 | 6/1972 | France. | |
| 2135565 | 12/1972 | France. | |
| 2147672 | 3/1973 | France. | |
| 2361586 | 3/1978 | France. | |
| 2434322 | 3/1980 | France. | |
| 233387 | 12/1968 | U.S.S.R. | 220/89 A |

*Primary Examiner*—William Price
*Assistant Examiner*—Gary E. Elkins
*Attorney, Agent, or Firm*—Brooks, Haidt, Haffner & Delahunty

[57] ABSTRACT

The invention relates to a safety device for protecting against any overpressures which may prevail in an enclosure, which device is constituted by a deformable membrane applied in fluid tight manner over an orifice connecting the inside of the enclosure with the outside, and by a perforated holder for the membrane, situated between the latter and the inside of the enclosure.

The invention finds an application in the protection against fluid overpressures is the tanks of a methane-tanker.

2 Claims, 7 Drawing Figures

SAFETY DEVICE AGAINST OVERPRESSURES

The necessity to protect different enclosures containing fluids under pressure against overpressures is known. Calibrated discharge valves are normally used to effect the protection. However, for a number of applications, the use of such valves is not entirely satisfactory, especially because of the relatively poor tightness of such valves.

The particular applications, described hereinafter by way of example, will help to understand the problem arising and as yet unsolved.

In the construction of methane tankers, tanks known as "membranes" are used which have a heat-insulated wall. Said walls show a very good resistance to the pressure forces directed outwardly from the inside of the tank, pressures which can reach several bars. The resistance to pressure forces directed inwardly from outside is, on the contrary, generally poor. For example, it is best to avoid that the external pressure on the tank be over ten millibars higher than the pressure prevailing inside the tank. Said external pressure occurs normally, in the space included between the main tank and a safety wall or membrane enclosing it and containing the heat insulating material. When the external pressure exceeds the prescribed value, the walls detach themselves from their support and the tanks are seriously damaged.

The application of a calibrated discharge valve to connect the space between the two walls with the atmosphere is not a good solution to the problem, because, to periodically check the tightness of the walls, a vacuum has to be created in the insulating space and any rise in the pressure has to be recorded over several scores of hours. These measures are delicate and any stray leaks coming from the pipings, and also from safety valves for example, have to be cured. For this reason, during these periodical control operations, the safety valves are replaced by solid joints. If the valves are not correctly re-fitted, there may be very serious risks of an accident which has been known to happen.

The device proposed by the present invention aims at protecting efficiently those spaces against any overpressure which may vary between 30 and 50 millibars, whilst remaining perfectly sealed under any excessive vacuum (e.g. of the order of 1,000 millibars). Thus, the device not be dismantled, since it is joined to the enclosures to be protected by welded piping, without any intermediate flange, so that it cannot be removed in one piece and that, consequently, any error of re-installation is absolutely impossible.

What has been explained hereinabove relatively to the constructions of tanks for methane-tankers also applies of course to any other construction where similar problems of security against overpressure and of tightness have to be solved concomitantly.

The invention therefore relates to a safety device for protecting against any overpressures that may prevail inside an enclosure, which device is constituted by a deformable membrane aplied in a fluid tight manner over an orifice connecting the inside of the enclosure with the outside, and by a perforated holder for the membrane, situated between the latter and the inside of the enclosure.

A membrane perforating means is placed on the side of the membrane facing away from the holder.

The following advantageous arrangements are preferably adopted:
  the membrane is made of elastomer;
  the device further comprises an auxiliary holder placed between the membrane and the perforated holder, only the centre part of the auxiliary holder being permeable and preferably, having a cross-shaped cutout part;
  the device includes means for detecting an intermediate overpressure less than the maximum overpressure which causes the membrane to burst;
  the holder is made of fritted material, constituting a flame-arrester device.

It is also the object of the invention to propose a tank designed to contain a liquefied gas, such as for example, a tank for a ship transporting natural gas in liquid form or oil gas in which the aforesaid safety device finds an application. In said tank, the enclosure is constituted by the space included between the internal wall defining the tank and a safety wall inside which is placed the said internal wall, and which is adapted to be either under overpressure or under vacuum, depending on the pressure prevailing inside the tank.

The invention will be more readily understood on reading the following description with reference to the accompanying drawings, in which.

Figure 1:
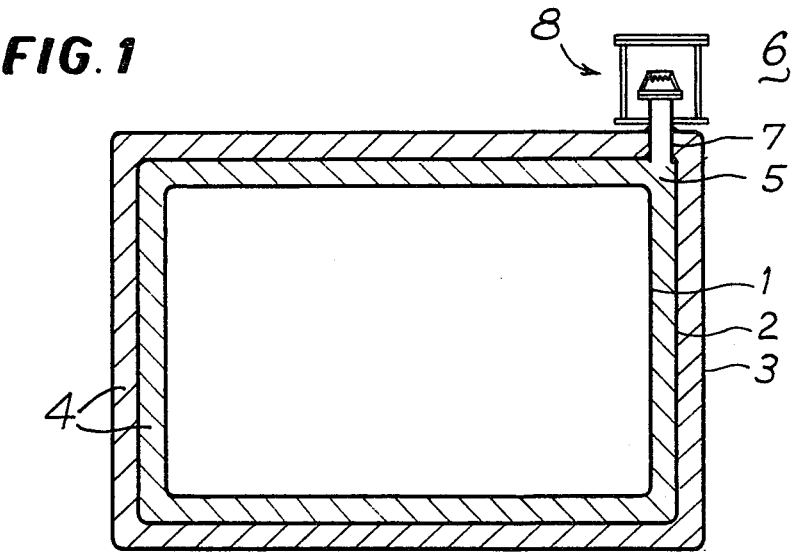
FIG. 1 is a vertical cross-section of a tank for use in methane-tankers, equipped with a device according to the invention.
Figure 3:
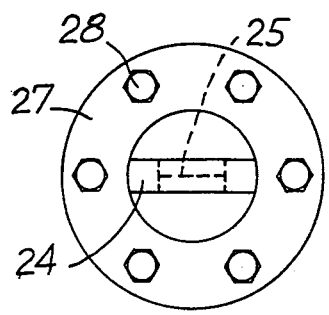
FIG. 3 is a view of the device shown in FIG. 2 taken in the direction of the arrow F of FIG. 2.
Figure 4:
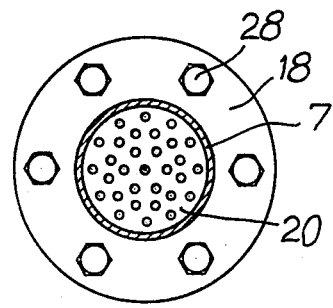
FIG. 4 is a cross-section of the device shown in FIG. 2 taken along along the line IV—IV shown in FIG. 2.

The methane tank shown in FIG. 1 comprises three successive walls 1, 2 and 3, of the "membrane" type, between two successive ones of which is placed a heat-insulating material 4. The space 5 included between the inside wall 1 and the next wall 2 is connected with the atmosphere 6 via a pipe 7 on which is fitted a device 8 according to the invention.

Figure 2:
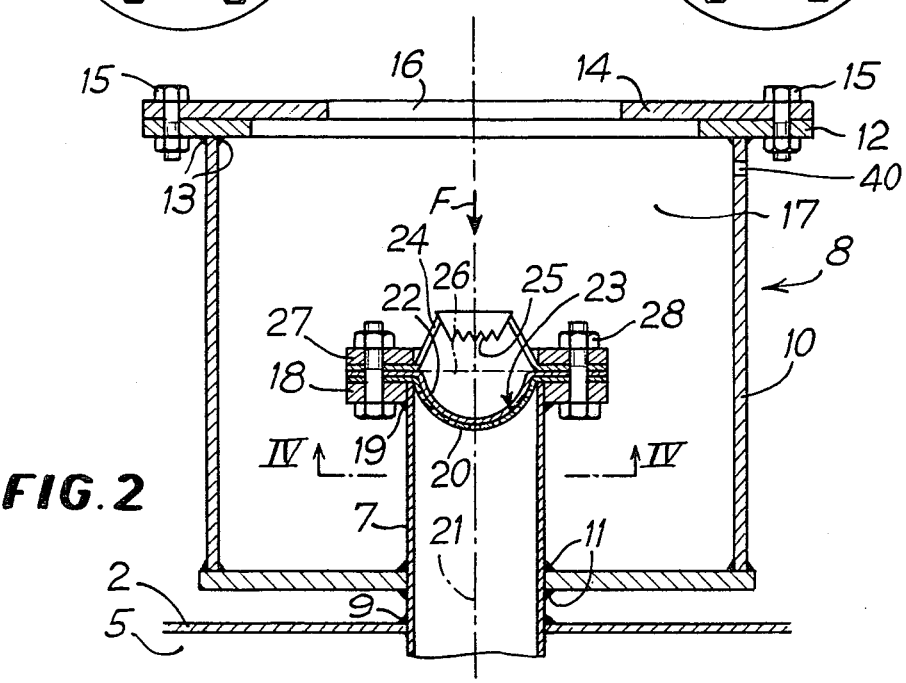
FIG. 2 is a vertical cross-section of a first embodiment of the device according to the invention with which is connected to the tank shown in FIG. 1.

Referring now to FIG. 2, it is noted that the pipe 7 is welded at 9 to the wall 2. A caisson 10 is secured by welding metal 11 to the upper part of the pipe 7, outside the space 5, and is provided at its upper part with a flange 12, welded at 13 and a closing counter-flange 14, which is secured to the flange 12 by means of screws 15. The counter-flange 14 is provided with a transparent window 16 giving a view of the inside 17 of the caisson without the counter-flange 14 having to be removed.

The safety device of the invention is mounted inside the said caisson 10, the inside of which communicates with the atmosphere via the opening.

A flange 18 is welded at 9 on the upper end edge of the pipe 7. A perforated holder 20, shaped as a semi-spherical calotte or dome co-axial to the axis 21 of the pipe 7, and whose convexity is oriented downwards, is fitted on said upper end of said pipe 7. A membrane 22, made from a very supple elastomer, is placed above the holder 20 and, in the configuration of FIG. 2, is supported by the concave upper face 23 of the holder, adopting the shape of the latter. The support 24 for a perforating toothed blade 25 is placed above the membrane, the blade 25, forming the perforating member, being spaced at a certain distance from the holder 20, and alone the securing plane 26 of the membrane 22. A counter-flange 27 is disposed opposite the flange 18, above the support 24, and bolts 28 keep in assembled position the periphery of the holder 20 on the flange 18, the periphery of the membrane 22 on that of the holder 20, the support 24 and the counter-flange 27.

Figure 5:
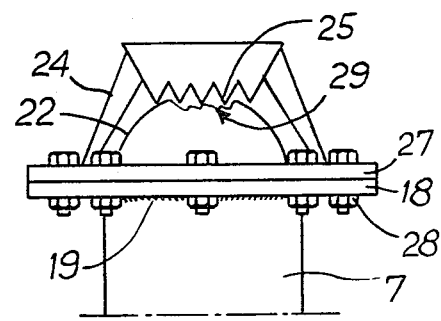
FIG. 5 is an elevational view of the device shown in FIGS. 2 to 4, showing the deformable membrane in the burst state.

FIG. 5 shows that the membrane 22 is pushed back by the pressure of the fluid contained in the pipe 7, towards the blade 25 and shows a bursting tear 29 at the contact with the blade.

Figure 6:
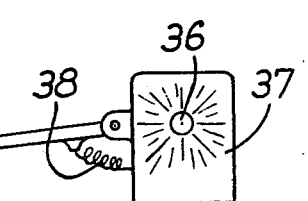
FIG. 6 is a vertical cross-section, similar to that shown in FIG. 2, of a second embodiment of the device according to the invention; and, FIG. 7 is a cross-section of the device shown in FIG. 6 taken along the line VII—VII shown in FIG. 6.
Figure 7:
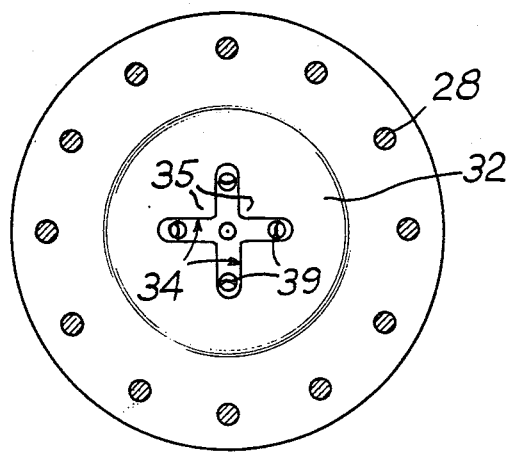

FIGS. 6 and 7 show a modified embodiment which is distinguishable from the first embodiment just described, by the following points:

the blade 25 is replaced by a sharp point 30, which is arrow-shaped and is provided with cutting edges 31;

a second holder 32, known as the auxiliary holder, is placed between the membrane 22 and the main holder 20 already described;

a position probe 33 is situated in the path of the membrane 22 between its configuration where it is supported by the holder 20 and 32, and its burst configuration in contact with the point 30.

The auxiliary holder 32 is a spherical calotte whose shape is adapted to that of the upper face 23 of the main holder 20 and which is solid except for a cross-shaped cut-out part in the centre. Said auxiliary holder can be made from a relatively rigid elastomer, much more rigid than the membrane 22, but supple enough, however, to allow the deformation of the angular panels 35 adjacent the cut-out part 34, under the effect of the pressure inside the pipe 7.

The probe 33 detects any swelling of the membrane 22 into a configuration in-between that of support by the holders 20 and 32 and that of maximum swelling, which corresponds to the bursting of the membrane 22. Said intermediate configuration before the bursting is thus detected and indicated by the operation of an alarm signal 36 activated by an alarm device 37 to which the probe 33 is linked by connection wires 38.

It will also be noted that the perforations of the main holder 20 are, quite simply, circular holes 39, the diameter D of which is preferably at the most equal to three times the thickness E of the membrane 22.

It will be apparent that the holder 20 may be a plane disk in fritted metal, and that the membrane perforating member can be of a type, known as active, and may, for example, be mounted for sliding in parallel to the axis 21 of the pipe 7 and be coupled with a spring-type release mechanism which projects it violently against the membrane 22, thereby increasing the efficiency of the perforation.

The devices described hereinabove work as follows.

First, it should be observed that a safety device against overpressures, of the type described hereinabove, can only work correctly if the three following elements are fundamentally present:

a fluid tight and deformable membrane,
a holder for said membrane, in the absence of which said membrane, being highly flexible, will not have the necessary resistance to withstand, without unacceptable deformation, the effects of any vacuum which may prevail in the enclosure, means for perforating the membrane so that, should a large overpressure prevail in the enclosure, the pressure is virtually instantly brought back to the atmospheric pressure.

To these three conditions, can be added a fourth implied one, which is that the membrane must be very flexible and that to this effect it is preferably made from an elastomer, the flexibility of which is greater than all the non-elastomer plastics known today.

Having stated this, it is noted that the devices proposed do fulfill the aforesaid requirements.

When at least a partial vacuum is created inside the space 5, the membrane 22 is supported by the main holder 20 or by the auxiliary holder 32. With a very flexible membrane, the auxiliary holder 32 gives a total support to the membrane, since it is solid over nearly its whole length.

When, on the contrary, there is an overpressure in the space 5, its effect is to push back the membrane towards the perforating member.

Said overpressure may be large and cause the membrane 22 to burst when coming into contact with the blade 25 or with the point 30. It can however have a lesser value and not cause the instant bursting of the membrane. It may help the control staff to be warned of the forthcoming burst configuration in order to give them time to react and to prevent the bursting. The position probe 33 allows this detection and, as a result, this prevention.

The devices described ensure a complete protection against overpressures, even small ones (30 to 50 millibars), which is not the case with the conventional calibrated discharge valves.

Said devices also permit personnel to conduct tests with vacuum conditions without any dismantling of the safety device, and therefore, permits the tightness of the initial assembly to be maintained.

It is finally to be noted that one of the advantages of producing the holder 20 in an alloy or in fritted metal is that, besides being easily produced, it can fulfil the extra function of flame-arrester, i.e. it can form a barrier preventing any flames from spreading between upstream and downstream sides of the device, in the case of the membrane 22 bursting.

The invention is not limited to the descriptions given hereinabove and, on the contrary, includes any modification which could be made thereto without departing from the scope or spirit of the invention.

What is claimed is:

1. An overpressure relief device comprising fluid flow means providing a tubular passageway having an input end for connection to an enclosure with fluid under pressure and an output end for exhausting said fluid to the atmosphere, an imperforate, flexible membrane blocking said passageway and connected at its edge in fluid-tight relation to said means so as to prevent the flow of fluid from said input end to said output end, said membrane having insufficient strength by itself to prevent rupturing deformation thereof when the pressure at said output end exceeds the pressure at said input end by a predetermined amount, a perforate membrane holder mounted in said passageway between said membrane and said input end for engaging said membrane when it moves toward said input end, said holder having sufficient strength to prevent rupturing deformation of said membrane when the pressure at said output end exceeds the pressure at said input end by said predetermined amount, membrane perforating means mounted on said fluid flow means adjacent said membrane at the side thereof opposite from the side thereof at which said membrane holder is disposed for puncturing said membrane when it moves toward said output end under fluid pressure and by a predetermined distance away from said holder and detector means for indicating fluid pressure in said passageway less than the pressure required to cause said membrane to engage said membrane perforating means, said detector means having control means mounted in the path of movement of said membrane and engageable by said membrane prior to the time that said membrane engages said membrane perforating means.

2. An overpressure relief device as set forth in claim 1 wherein said enclosure is a tank having a plurality of spaced walls and wherein said device is connected to said tank with the input end of said tubular passageway in fluid communication with the space between a pair of said walls and with the output end of said tubular passageway opening to the atmosphere exteriorly of said tank.

* * * * *